(12) United States Patent
Battlogg et al.

(10) Patent No.: US 9,217,487 B2
(45) Date of Patent: *Dec. 22, 2015

(54) MOVEMENT DAMPING APPARATUS AND VALVE

(71) Applicant: INVENTUS ENGINEERING GMBH, St. Anton Im Montafon (AT)

(72) Inventors: Stefan Battlogg, St. Anton Im Montafon (AT); Juergen Poesel, Bludenz (AT); Gernot Elsensohn, St. Anton Im Montafon (AT)

(73) Assignee: INVENTUS ENGINEERING GMBH, St. Anton IM (AT)

( * ) Notice: Subject to any disclaimer, the term of this patent is extended or adjusted under 35 U.S.C. 154(b) by 76 days.

This patent is subject to a terminal disclaimer.

(21) Appl. No.: 13/798,781

(22) Filed: Mar. 13, 2013

(65) Prior Publication Data

US 2014/0097593 A1    Apr. 10, 2014

Related U.S. Application Data

(63) Continuation of application No. 13/060,092, filed as application No. PCT/EP2009/006080 on Aug. 21, 2009, now Pat. No. 8,418,819.

(30) Foreign Application Priority Data

Aug. 22, 2008    (AT) ................ A 1307/2008

(51) Int. Cl.
*F16F 9/53* (2006.01)
*B60R 22/28* (2006.01)
*B62K 25/04* (2006.01)

(52) U.S. Cl.
CPC ............... *F16F 9/537* (2013.01); *B60R 22/28* (2013.01); *B62K 25/04* (2013.01); *F16F 9/535* (2013.01); *B60R 2022/282* (2013.01); *B60R 2022/288* (2013.01); *Y10T 137/2082* (2015.04)

(58) Field of Classification Search
CPC .............. F16F 9/53; F16F 9/535; F16F 9/537
USPC .................................. 188/267, 267.1, 267.2
See application file for complete search history.

(56) References Cited

U.S. PATENT DOCUMENTS

| 3,406,704 A | 10/1968 | Van Fossen |
| 3,626,964 A | 12/1971 | Van Fossen |
| 5,277,281 A | 1/1994 | Carlson et al. |

(Continued)

FOREIGN PATENT DOCUMENTS

| DE | 935831 C | 12/1955 |
| DE | 4433056 A1 | 3/1996 |

(Continued)

*Primary Examiner* — Thomas J Williams
(74) *Attorney, Agent, or Firm* — Laurence Greenberg; Werner Stemer; Ralph Locher

(57) ABSTRACT

In a movement damping apparatus, a magnetorheological fluid is pressed through a flow path. A device generating a variable magnetic field comprises a core around which a coil is wound as well as pole surfaces in the flow path, the magnetic field acting on the magnetorheological fluid by way of said pole surfaces. The coil is arranged within the flow path along with the core, the axis of the coil extending perpendicular to the direction of flow of the magnetorheological fluid. The flow path has a jacket made of a magnetically conducting material.

27 Claims, 6 Drawing Sheets

(56) References Cited

U.S. PATENT DOCUMENTS

| | | |
|---|---|---|
| 5,362,027 A | 11/1994 | Champaigne et al. |
| 5,632,361 A | 5/1997 | Wulff et al. |
| 6,131,709 A | 10/2000 | Jolly et al. |
| 6,336,535 B1 | 1/2002 | Lisenker |
| 6,439,356 B1 | 8/2002 | Butera et al. |
| 6,454,059 B1 | 9/2002 | Lonbani et al. |
| 6,471,018 B1 | 10/2002 | Gordaninejad et al. |
| 7,922,202 B2 | 4/2011 | Battlogg et al. |
| 8,251,402 B2 | 8/2012 | Battlogg et al. |
| 8,430,416 B2 * | 4/2013 | Battlogg et al. ......... 188/267.2 |
| 2008/0060710 A1 | 3/2008 | Carlson et al. |
| 2008/0245629 A1 | 10/2008 | Battlogg et al. |
| 2011/0140392 A1 | 6/2011 | Battlogg et al. |

FOREIGN PATENT DOCUMENTS

| | | | |
|---|---|---|---|
| DE | 19816549 A1 * | 6/1999 | |
| DE | 10055388 A1 | 3/2002 | |
| DE | 10131799 A1 * | 1/2003 | |
| EP | 335016 A1 * | 10/1989 | |
| EP | 1249637 A1 | 10/2002 | |
| WO | 0037298 A1 | 6/2000 | |
| WO | 2007068436 A1 | 6/2007 | |

* cited by examiner

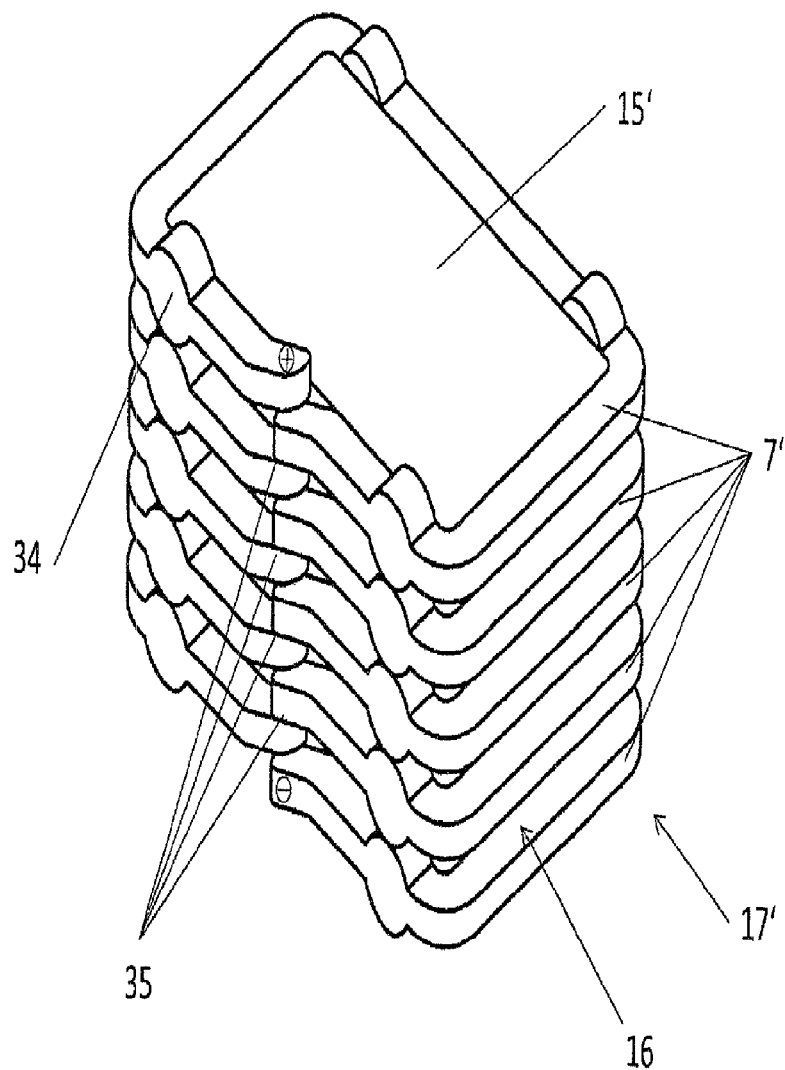

MOVEMENT DAMPING APPARATUS AND VALVE

CROSS-REFERENCE TO RELATED APPLICATION

This application is a continuation of patent application Ser. No. 13/060,092, filed Feb. 22, 2011; which was a §371 national stage of international application PCT/EP2009/006080, filed Aug. 21, 2009, which claims the priority, under 35 U.S.C. §119, of Austrian patent application No. A1307/2008, filed Aug. 22, 2008; the prior applications are herewith incorporated by reference in their entirety.

BACKGROUND OF THE INVENTION

The invention relates to a movement damping apparatus, in which a magnetorheological fluid is forced through a flow path, having a device which produces a variable magnetic field and has pole surfaces in the flow path, via which pole surfaces the magnetic field acts on the magnetorheological fluid in order to control the flow characteristics.

In order to allow the flow characteristics of a magnetorheological fluid to be influenced by means of a magnetic field such that the flow resistance of the flow path is changed, various criteria must be satisfied. A magnetic field which is produced by a coil must be introduced into the magnetorheological fluid, for which purpose elements and parts of the apparatus which are provided for the direct path of the lines of force through the magnetorheological fluid should have higher magnetic permeability than other elements and parts which are not located on the direct path of the lines of force.

An apparatus which absorbs energy in the event of an impact is described, for example, in WO 2007/068436. The magnetic field is produced by a coil, which is provided with a C-shaped core composed of magnetically active material, in particular an iron core. An outlet channel with a rectangular cross section and which contains the flow path is passed through between the two pole surfaces of the C-shaped core, which are a short distance apart. The walls of the outlet channel, which rest on the pole surfaces, are composed of magnetically highly permeable material while, in contrast, the side walls are composed of a material which at least has a lower magnetic permeability than the magnetorheological fluid.

Movement or oscillation dampers with pistons and cylinders which contain a magnetorheological fluid and whose flow characteristics can be adjusted by means of a variable magnetic field are disclosed, for example, in DE 935831, DE 4433056 or U.S. Pat. No. 5,277,281. The magnetic field is produced by windings or coils whose axes extend in the movement direction of the piston, and therefore in the flow direction. The magnetorheological fluid is forced through a circumferential gap between the piston and the inner wall of the cylinder. DE 935831 discloses a stationary coil, which is arranged externally around the cylinder, while DE 4433056 contains the coil and a permanent magnet in the piston. According to U.S. Pat. No. 5,277,281, the piston is formed by a core around which the coil is wound, with the magnetic circuit including two annular areas of the cylinder wall, which are separated from one another. The lines of force therefore pass through the magnetorheological fluid with an axial separation, with the direction of the magnetic flux changing.

Since carbonyl-iron particles have no poles, the direction change is irrelevant, but the axial separation does play a role, since the particles must form new chains. Furthermore, the area or volume ratio of the coil to the core is very poor, leading to premature magnetic saturation of the core in the interior of the coil.

SUMMARY OF THE INVENTION

The invention is now based on the object of optimizing the introduction of the magnetic forces which cause the viscosity of the magnetorheological fluid to change, and achieves this object by the technical teaching of claim 1 or of claim 3.

It is essential that the pole surfaces are provided on a core around which a coil is wound, the axis of which coil is at right angles to the flow direction of the magnetorheological fluid, and that the flow path has a sheath composed of a magnetically permeable material. In particular, the magnetically permeable material is a material as is used for coil cores, and which is also referred to here from now on as coil core material.

The coil axis, which according to the invention is rotated through 90° in contrast to the described prior art and which therefore lies on a cross-sectional plane of the flow path, results in the flow path having an uninterrupted length, in which the magnetic flux passes approximately uniformly through the magnetorheological fluid, thus making it possible to improve the magnetization and to install a weaker device for magnetic field production. The core is wound, that is to say the pole surfaces of the core are within the coil and fill the coil cross section, and the area or volume ratio is considerably better.

Since there are no coils together with a core on the outside, and the sheath of the flow path, which sheath is composed of magnetically permeable material and is in general a tube or the like composed of iron, a low-alloy-content steel or some other ferromagnetic material or coil core material, is included in the magnetic circuit, this results in a particularly space-saving design, which can be used even in extremely restricted space conditions.

Two preferred options for accommodation of the device that produces the variable magnetic field within the sheath of the flow path will be described in the following text.

In a preferred first embodiment, the flow path is subdivided by the core, around which the core is wound, into two flow sections. In particular, in this case, each of the two flow sections is also subdivided by at least one partition wall having further pole surfaces.

Each subdivision or partition wall admittedly reduces the cross-sectional area of the flow path and therefore the volume of the fluid which can be magnetized per unit time, but the shorter distances between two respective pole surfaces result in considerably better magnetization. This makes it possible to increase the overall height of the flow path such that its flow cross section can be kept large, corresponding to the volume to be magnetized of the magnetorheological fluid to be forced through, despite the partition wall.

A plurality of partition walls are preferably joined together to form a pack, and are inserted into the flow path. The distances that govern the level of magnetization between the pole surfaces are very small in this pack.

The internal coil and the partition walls reduce the free flow cross section, such that the inlet into the flow path represents a constriction, with the flow path preferably being provided in an outlet channel of the container. The considerably better magnetization of the magnetorheological fluid even makes it possible for the flow path to have a larger free cross-sectional area than the container, if required, when there are a large number of pole surfaces separated by short distances, as a result of which, in this situation, the constriction even comprises a widened area.

The additional pole surfaces increase the number of particles in the magnetorheological fluid which interact with the magnetic field. As far as possible, turbulence in the flow should be avoided in this case, or at least not promoted, in order to improve the effect. The installation of partition walls which have a smooth surface that does not promote turbulence is therefore to be preferred. Flat surfaces are particularly suitable. Upright webs or edges are disadvantageous. In contrast to this, friction-increasing layers are invariably feasible and possible.

In a first embodiment, the pack may be formed from partition walls which extend parallel to the flow sections and are held separated by upright spacers or lugs, in particular bent-up edge lugs. The pack can be held together by any desired connection on the lugs, direct adhesive bonding, soldering, adhesive strips or the like. By way of example, 16 partition walls with a thickness of 0.2 mm may be provided, which subdivide the outlet channel into 17 flow sections of 0.2 mm. The outlet channel therefore has an unobstructed height of 6.6 mm in the area of the pole surfaces. In another embodiment of the invention, the pack of partition walls can also be produced by folding a material web in a zig-zag shape. The partition walls, which extend parallel to the flow sections, may, for example, be manufactured from coil core material and may be separated from one another by spacers or webs composed of a material which has lower magnetic permeability than the magnetorheological fluid.

At least some of the partition walls, but preferably all the partition walls, are flat and formed without projections, and are aligned at right angles to the lines of force of the magnetic field, which are constrained between the pole surfaces.

In a further preferred embodiment, the partition walls extend in a row close to one another at right angles to the flow direction in the flow path and have aligned slots, which form the flow sections. In this case, the slot walls represent the additional pole surfaces. A partition wall such as this may be produced as a stamped sheet-metal part, as a sintered part or as a metal-injection-molded part (MIM), in which case, for example, it appears to be like a ladder or comb. The remaining webs between the slots can preferably extend on both sides of a central connecting web.

In one particularly advantageous embodiment, which can be produced easily, the partition walls are stamped out of transformer laminate and are insulated, in particular lacquered, at least on the mutually touching surfaces. The insulation prevents Eddy currents that are created from being able to accumulate.

In a further preferred embodiment, the partition walls are joined together in two packs, which are arranged on both sides of the core, around which the coil is wound. The core, which is arranged between the two packs of partition walls, is preferably an approximately cuboid block, around which the coil winding is placed, whose axis is at right angles to the flow direction through the outlet channel. The core within the coil can likewise contain flow sections, if the winding of the coil leaves inlet and outlet openings of these flow sections free.

The invention also makes it possible in a simple manner to provide the sheath with a cylindrical cross section. In this preferred embodiment, the apparatus comprises, in particular, a continuous cylindrical tube, as is particularly advantageous at relatively high pressure levels, in order to absorb the stresses with little deformation and in which, as mentioned, the constriction is formed by the coil together with the core, and preferably also the two packs of partition walls. In this embodiment, each pack is preferably terminated by an element with a cross section in the form of a circle segment and composed of magnetically highly permeable material, for example of a transformer laminate, ferrite powder or some other coil core material, such that the cylindrical tube is filled. In this embodiment, the magnetic circuit is completed by the elements composed of coil core material which have a cross section in the form of a circle segment and whose curved surfaces rest on the inner face of the tube, which is composed of magnetically high permeability material.

Starting from the core of the coil, approximately in the center of the flow path, the lines of force therefore run at right angles outwards through the flow section and a pack of partition walls with additional pole surfaces and an element in the form of a circle segment, into the cylindrical tube, from which they return diametrically opposite through the second element in the form of a circle segment and the second flow section or a second pack of partition walls into the wound core which is arranged in the center.

If, as described above, the partition walls are stamped from the coil core material, then the remaining webs cannot consist of magnetically poorly permeable material; however, it has been shown that the webs become magnetically saturated if correspondingly minimized, such that the magnetic field is nevertheless forced adequately through the flow sections. Alternatively, it is advantageously possible to provide cutouts in the partition walls, through which holders composed of magnetically less permeable or non-permeable material are passed, and keep the partition walls separated from one another.

In a further embodiment, it is possible for the pack to have a cavity which is continuous over the length and extends centrally in the outlet channel. This embodiment allows a component to be passed through the constriction and the inserted pack. By way of example, this component may be a cable, a piston rod or the like. A pulling device such as this is described in more detail in WO2007/068435. This embodiment of the invention allows a particularly simple and compact embodiment, in which there is very little loss of the effect of the introduced magnetic field.

A further possible way to accommodate the device which produces the variable magnetic field within the sheath of the flow path is to provide two three-dimensional coils which have an approximately semicircular section between in each case two straight sections which extend in the longitudinal direction. The two three-dimensional coils are arranged in mirror-image form with respect to one another, and it is in each case possible to provide an element in the form of a circle segment as a core, in which case a pack of partition walls is then preferably inserted between the two elements in the form of circle segments. A continuous cavity can advantageously be formed in the interior of the single pack which is located between the two elements in the form of circle segments.

If the partition walls are provided at right angles to the flow path and are stamped from transformer laminate or from some other coil core material, then it is furthermore preferable for at least the webs which separate the slots, and preferably also a central area associated with the core, as well as elements in the form of circle segments to be formed integrally, and cohesively over at least one connecting web, in each partition wall.

Movement damping apparatuses according to the invention can be provided in widely differing applications. Since a high switching efficiency can be achieved with a relatively small coil current, this results in the further advantage that it is sufficient to use a portable electrical power source of relatively small size, thus considerably extending the options for use of the apparatus according to the invention. In this case, the term switching efficiency means that the current flow makes it possible to achieve a high viscosity change.

Magnetorheological damping is therefore possible in portable arrangements, for example in a ski boot, a snowboard boot, a cross-country skiing boot, or a running shoe. Furthermore, the damping apparatus can be used in the saddle support or shock absorbers of a bicycle, or other mobile vehicles which do not have their own electrical power supply. The damping apparatus which is used as a restriction at the transition between the two subareas before and after the flow path, for example in a cylinder or the like, may have pressure sensors in front of and/or after the flow path, temperature sensors, position measurement sensors, volume flow measurement sensors, etc., thus allowing a control system to keep the flow characteristics of the magnetorheological fluid constant, or to change them in a defined manner, independently of external influences.

When the maximum current flows, the damping apparatus according to the invention leads to blocking of the flow path, as a result of which said apparatus can also be used as a magnetorheological valve. One major advantage in this case can be seen in the capability to cope with pressures in the range of 300 bar or more, without any problems. By way of example, the normal pressure in the open state is 1 bar, while a pressure in the region of 300 bar can be coped with when the valve is in the closed state. This allows the apparatus to also be used as a valve for continuously variable open-loop/closed-loop control of hydraulic systems in mechanical diggers, heavy-load machines, cranes, commercial vehicles, armored vehicles, machine tools, aircraft and in medical technology, etc.

Furthermore, the component which produces the field, that is to say the winding, may if required also be used for heating the magnetorheological fluid.

In a further embodiment of the apparatus according to the invention, the entire device for producing the variable magnetic field (coil, partition wall packs, core, etc.) can also be moved axially in a cylindrical tube, for example in order to move the belt lock fastening for a safety belt apparatus, and to adjust it for different drivers. In this case, the device can advantageously be pulled or pushed by means of a piston rod, through whose hole the cable for the power supply can be passed, or can be moved by means of a cable.

Instead of the belt lock, the safety belt (safety-belt winding-up apparatus) can itself also be influenced in a similar manner by the apparatus according to the invention.

Other features which are considered as characteristic for the invention are set forth in the appended claims.

Although the invention is illustrated and described herein as embodied in a movement damping apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 13 shows a perspective view of a partition wall stack with individual partition wall coils.

DETAILED DESCRIPTION OF THE INVENTION

Figure 1:
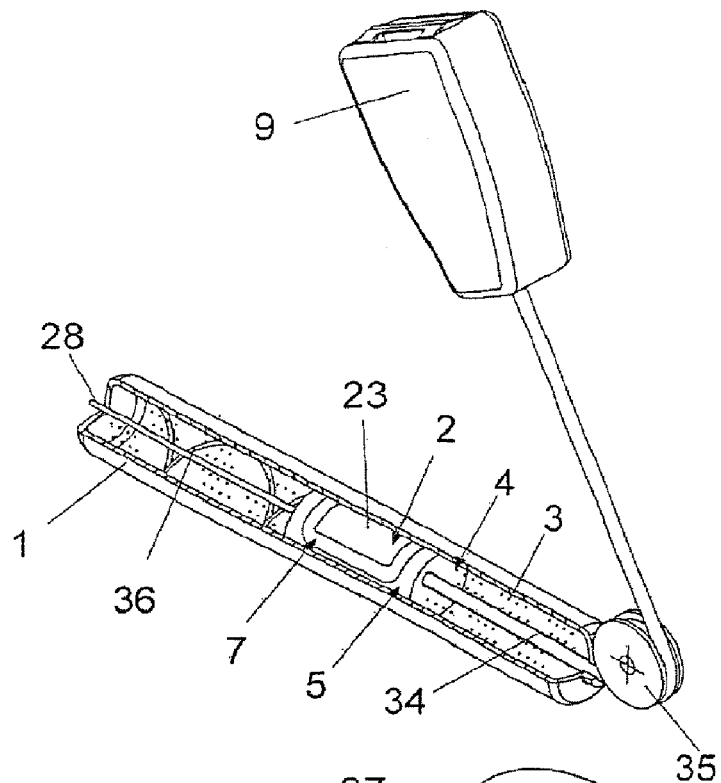
FIG. 1 shows a schematic detail of a safety belt lock attachment having an apparatus according to the invention as shown in FIG. 9.
Figure 4:
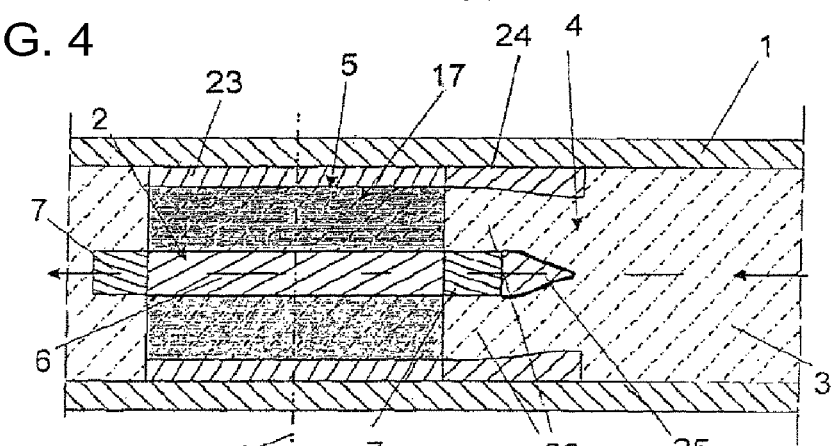
FIG. 4 shows a longitudinal section through a second embodiment of the apparatus.

A movement damping apparatus can, as shown in FIG. 1, be provided, for example, in the attachment of a belt lock 9 of a safety belt in a motor vehicle. The apparatus has a container 1 which contains a magnetorheological fluid 3 (FIG. 4). The container 1 is fixed to a part of the vehicle chassis. A device 2 for production of a variable magnetic field, in the form of a piston, can be moved axially in the container 1, with the device being attached to a piston rod or a cable 34. The cable 34 runs to the outside and over a guide roller 35 to the belt lock 9. A return spring 36 and an electrical line 28 are arranged at the end remote from the cable 34. The magnetorheological fluid 3 which is contained in the container 1 is forced through a flow path 5 which is formed in the device 2, when the cable 34 is pulled. The variable magnetic field which is present within the flow path acts on the magnetorheological fluid, thus changing its viscosity and delaying the pressure through the flow path 5. The opposing force produced in this way converts kinetic energy to heat.

The cable 34 can also be connected directly or indirectly to the safety belt or belt winding-up apparatus.

The junction between the container 1 and the flow path 5 represents a constriction 4. The device 2 has an electromagnet, which has a coil 7 and a core 6, 23 and is used to produce a magnetic field. The electromagnet can be operated via signals from sensors which monitor for an impact, as a function of various criteria, such as weight and the seating position of the driver, etc., with the variable magnetic field varying the viscosity of the magnetorheological fluid 3 to be forced through the opening, thus increasing or decreasing the opposing force in the system, starting from the constriction 4.

Figure 2:
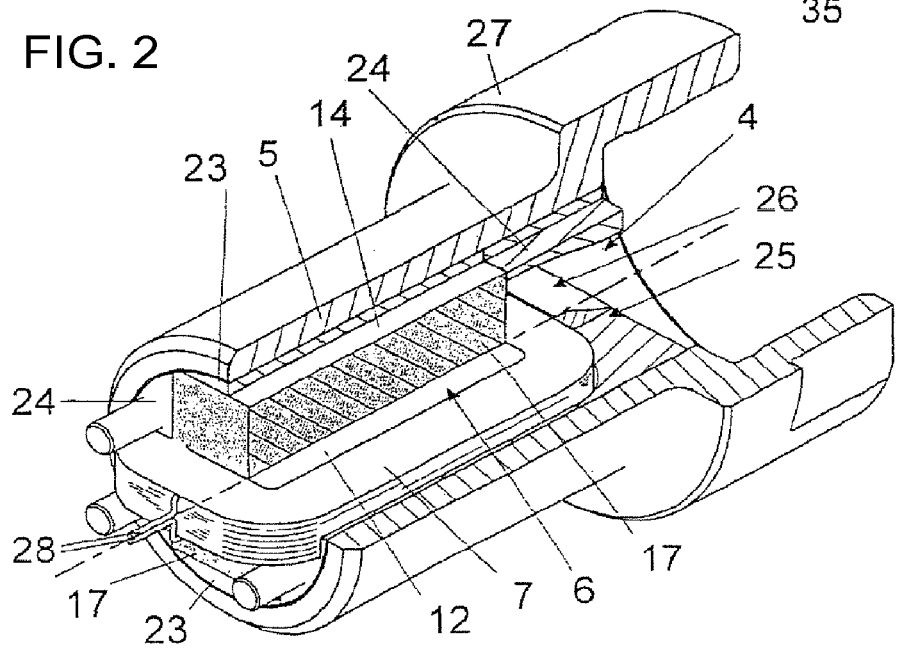
FIG. 2 shows a partially sectioned oblique view of a first embodiment.

The magnet coil arrangement is provided in the interior of the flow path 5. FIG. 2 shows an oblique view, sectioned at an angle, through the sheath of the flow path 5, which is illustrated as a cylindrical piece of tubing with a threaded collar 27. The container 1 can be screwed into the threaded collar 27, and is likewise formed by a piece of tubing of the same diameter. The constriction 4 at the start of the flow path 5 is formed by a wedge-shaped central web 25 of an insert 24, thus subdividing the magnetorheological fluid 3 into two flow elements 26 as it passes through the flow path. The coil arrangement 2 has a magnet coil 7, whose axis is at right angles to the flow path 5 and which is arranged centrally in the outlet channel such that it is covered by the wedge-shaped central web 25 (FIG. 4). A core 6 is arranged within the coil 7, which core 6 in this embodiment is cuboid and has flat, mutually parallel pole surfaces 11, 12.

Figure 3:
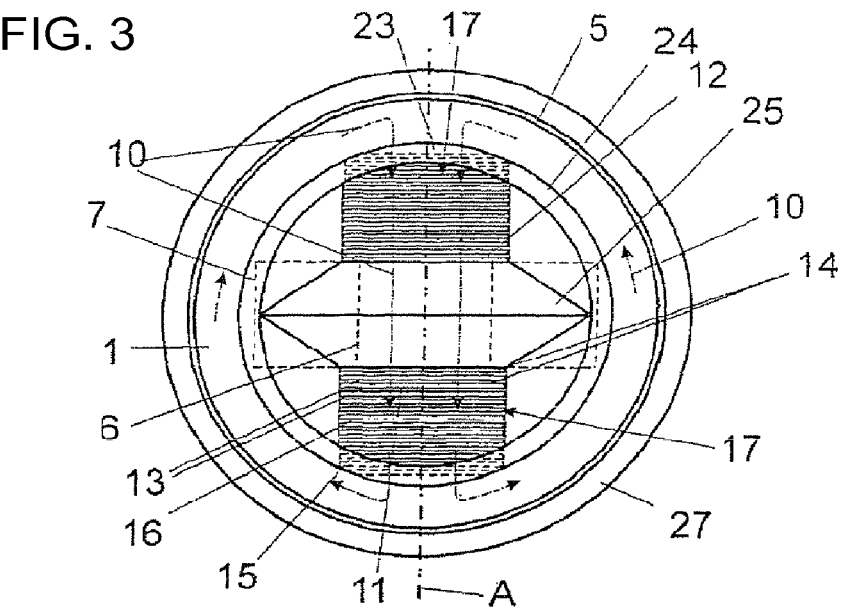
FIG. 3 shows an end view on the container side of the first embodiment.

A soft-magnetic material, a permanent magnet or a combination of permanent magnets and soft-magnetic materials can be used as the core. An element 23 (pole cap) approximately in the form of a circle segment is provided in each case beyond each flow element 26, is manufactured from coil core material and rests on the inside of the cylindrical tube or channel which surrounds the flow path 5. The channel is likewise produced from a coil core material, for example from an iron tube or the like, in order to close the magnetic lines of force 10. At the outlet end, the electrical connecting lines 28 are passed out of the outlet channel in a manner which is not illustrated in any more detail. The magnetic permeability of the magnetorheological fluid 3 is less than that of the core 6, of the elements 23 in the form of circle segments and of the channel, as a result of which the effect of the magnetic field illustrated by the lines of force 10 in FIG. 3 is dependent on the height of the gap between the core 6 and the element 23 in the form of a circle segment, that is to say the height of each flow element 26.

Since the magnetization of the magnetorheological fluid 3 becomes better the less the height of the flow path 4, each flow element 26 is subdivided on both sides of the core 6 into flow sections 16 by partition walls 15, which are composed of a highly permeable coil core material and, in particular, are joined together to form packs 17. Each partition wall 15 reduces the height and forms additional flat pole surfaces 13, 14, in which case the partition walls 15 composed of coil core material can be separated from one another by webs 22 which are composed of less magnetically permeable material.

In addition to iron, as the best material with good "magnetic" characteristics, it is also possible to use the following as coil core materials: Silicon-iron, a relatively advantageous material with good magnetic characteristics, poor electrical conductivity and very little remanence, magnetic steel, a material which costs somewhat more, does not corrode and has somewhat poorer magnetic characteristics, nickel iron, a traditional soft-magnetic alloy which costs more and has a very high permeability, and iron-cobalt as the most expensive material, but with the best saturation flux density.

Other materials are possible, depending on the [purpose (for example core composed of ferrite, iron powder or other powder mixtures). More "exotic" materials may offer advantages (for example, BASF Catamold FN50 which is suitable for injection molding).

Figure 5:
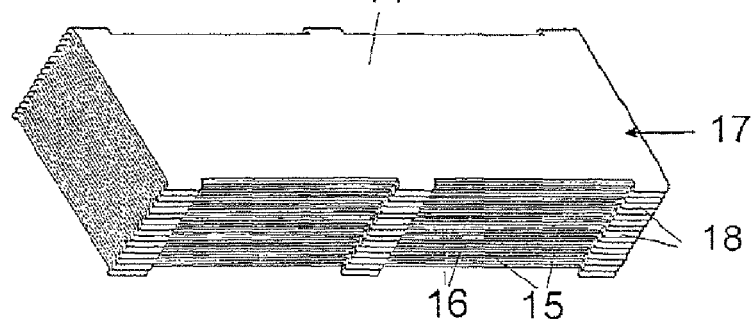
FIG. 5 shows an oblique view of a pack of partition walls of a first embodiment.

FIG. 5 shows partition walls 15 which have bent-out lugs 18 on the two longitudinal side edges, by means of which partition walls 15 are held separated, and bound a multiplicity of flow sections 16. The partition walls 15 are connected to form a pack 17 via the lugs 18 by means of adhesive bonding, soldering or the like, and the pack 17 may be inserted as a unit into the outlet channel. By way of example, the partition walls 15 are composed of a transformer laminate, that is to say a material with very high magnetic permeability, and the pack 17 illustrated in FIG. 5 in each case comprises sixteen partition walls 15 and flow sections 16, which all have the same thickness and height of, for example, 0.2 mm. The pack 17 therefore has an overall thickness of 6.2 mm.

The pack 17 has a central cavity 21 through which, for example, a piston rod or a cable can be passed, which cable pulls against the pressure surface, for example a piston, which forces the magnetorheological fluid 3 out of the container 1, as is disclosed in the cited WO 2007/068435.

Figure 6:
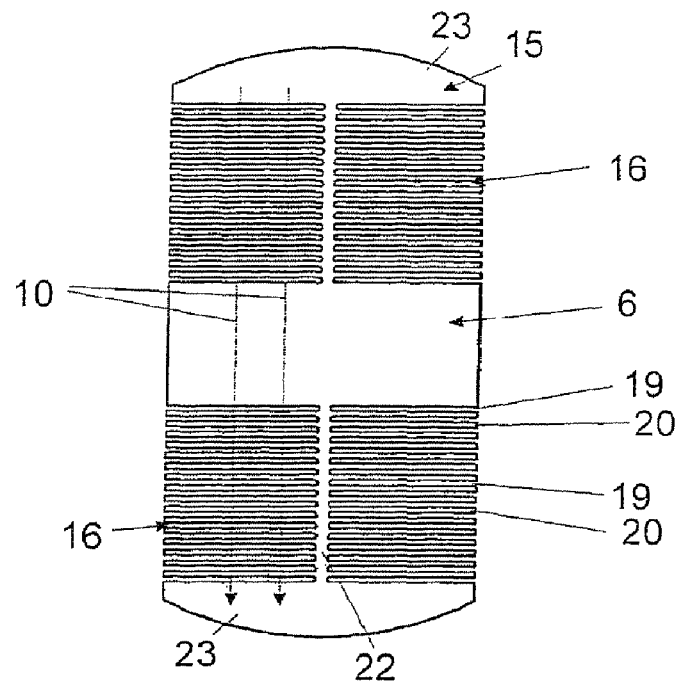
FIG. 6 shows a second embodiment of a partition wall.
Figure 7:
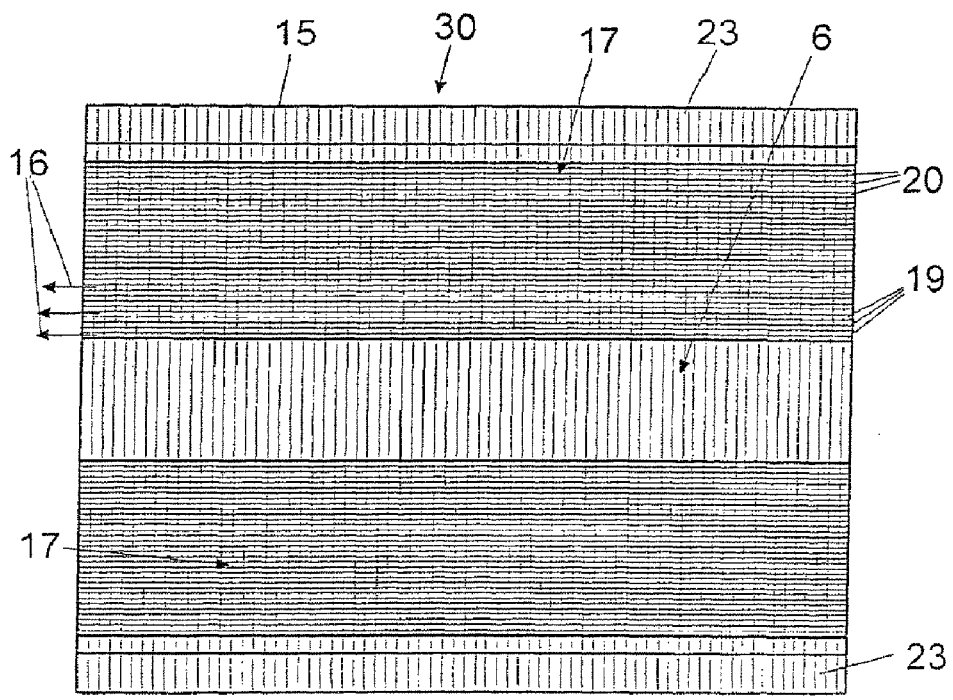
FIG. 7 shows an enlarged side view of a pack of partition walls of the second embodiment.

However, a pack 17 may be composed not only of partition walls 15 which extend in the longitudinal direction of the flow path 5. FIGS. 6 and 7 show a second option, in which a pack 17 of partition walls 15 is designed with flow sections 16. In this case, each partition wall 15 extends on a radial plane at right angles through the outlet channel, and the flow sections 16 are composed of slots 19 which are incorporated in the partition walls 15. In particular, a partition wall 15 such as this may be stamped from a transformer laminate or the like, with a multiplicity of slots 19 being separated from one another by webs 20, which project from a central connecting web 22 (FIG. 6). The slots 19 thus extend as far as the edge, and are covered by side parts of the insert 24. Connecting webs 22 could, of course, also be provided on both edges, with the slots 19 extending between them, without any central interruption. As shown in FIG. 7, a plurality of partition walls 15 are arranged directly one behind the other, with the slots 19 being aligned. The slot walls in this case represent the additional pole surfaces 13, 14.

It is also feasible for the partition wall pack to be in the form of a folded element.

Manufacturing by stamping out from the transformer laminate or the like also makes it possible to produce the coil core 6, the two packs 17 of partition walls 15 and the terminating elements 23 in the form of circle segments for matching to the cylindrical cross section of the outlet channel 5 in one piece, which then has the shape shown in FIG. 6. The side surfaces, which rest on one another, of the partition walls 15 may be provided with an electrically insulating lacquer, thus preventing Eddy currents which are created in the individual partition walls 15 from accumulating. The part 30 shown in FIG. 7 is fitted with the coil 7 and is inserted into the insert 24, which is then introduced into the outlet channel and is fixed axially, for example with the aid of the holding pot which has been mentioned and can be screwed onto the outlet-side end. The insert 24 is composed of a magnetically poorly permeable material, for example a plastic.

Figure 8:
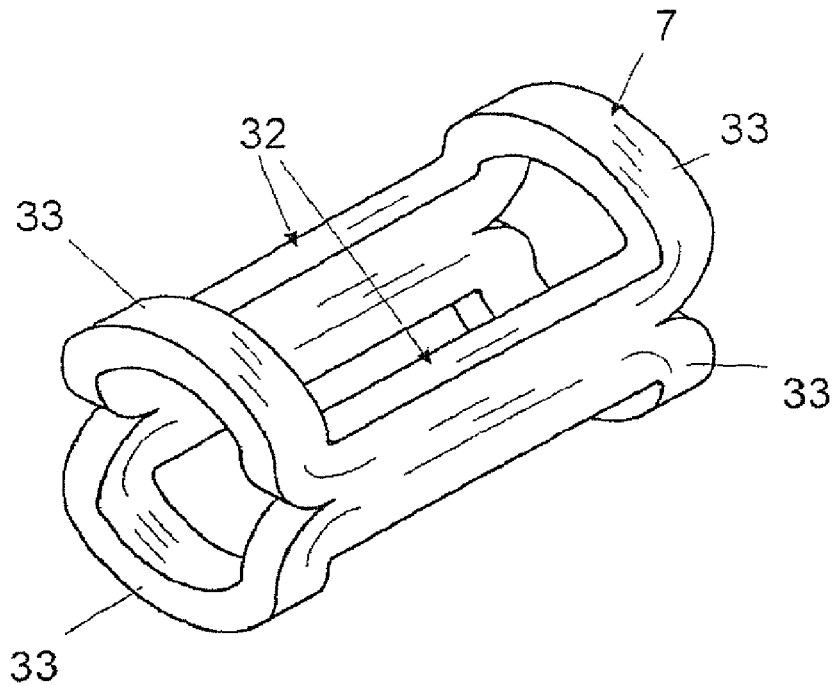
FIG. 8 shows an oblique view of a second embodiment of a magnet coil.
Figure 9:
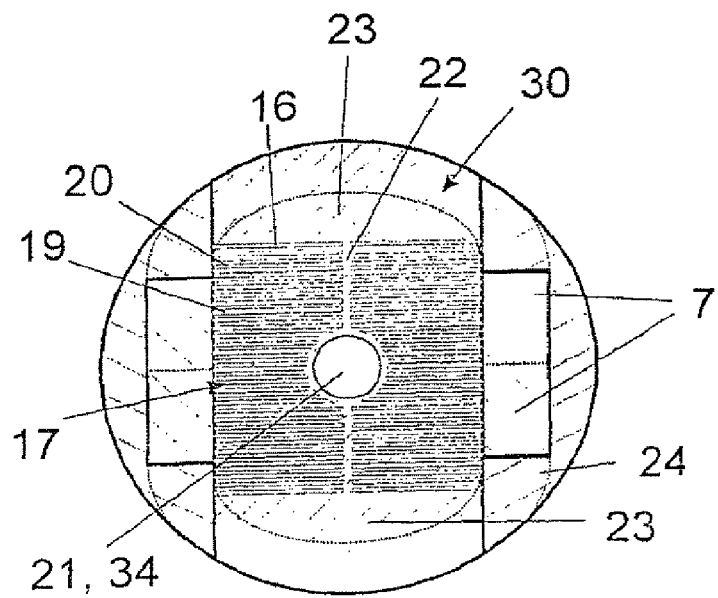
FIG. 9 shows a cross section through a third embodiment of the apparatus with a magnet coil as shown in FIG. 8.

FIGS. 8 and 9 show two embodiments, in which the coil 7 is wound three-dimensionally, that is to say each winding is not located on one plane but is composed of a plurality of sections, with an approximately semicircular section 33 being routed upwards or downwards in each case between the straight sections 32 which extend in the outlet channel in the longitudinal direction of the flow path 5. The coil 7 is thus open at the ends and a part 30, as shown in FIG. 9 may have a central cavity 21 through which, for example, the pulling means mentioned above can be passed to the piston or the base of the container 1. However, the cavity 21 may also be used to hold a connecting element for the pack 17 of partition walls 15, or the cable 34 as shown in FIG. 1. Since the coil 7 is spread out at the ends, the core 6 may also have flow sections 16 within the coil 7, which flow sections 16 are formed between aligned webs 20 through slots 19.

The form illustrated in FIG. 8 may also be produced by two coils 7, as is indicated in FIG. 9. In this embodiment, each of the two coils 7 has an associated element 23 in the form of a circle segment as a core, with a pack 17 of partition walls 15 being arranged between the two elements 23, and the pack 17 having flow sections 16 and a central cavity 21. The insert 24 is annular and is inclined toward the container 1, forming the constriction 4 (FIG. 4).

The device which is arranged in the magnetorheological fluid 3 or in the flow path 5 in order to produce the variable magnetic field may also comprise a printed circuit board with a planar coil and a core, in which case even further electronic components for controlling the device 2 may also be arranged on the printed circuit board.

The coils 7 may be manufactured not only from an insulated copper wire but also from a copper strip, a copper foil or an anodized aluminum foil.

It is also feasible to arrange a plurality of the movement damping apparatuses one behind the other (in series), which can be operated differently.

Figure 10:
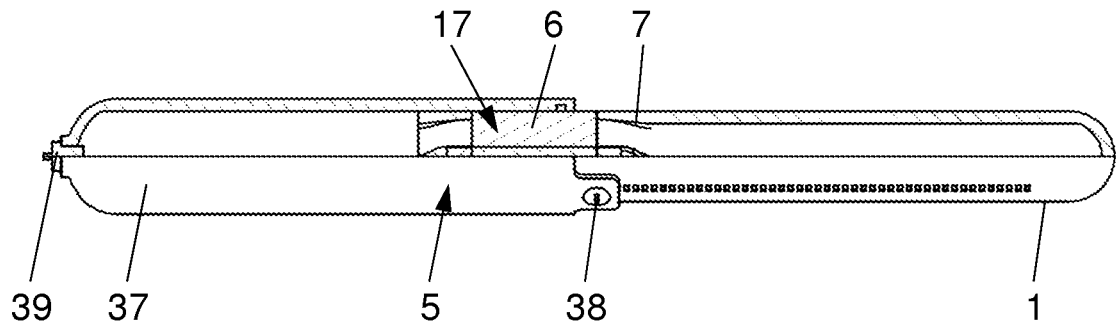
FIG. 10 shows a partial longitudinal section through a fourth embodiment of the apparatus.

FIG. 10 shows an embodiment in which a container-like closure 37 is fitted, forming a seal, to the container 1 at one of whose ends the flow path is provided, in which case the container 1 and the closure 37 can be pushed one inside the other, reducing the internal area. The closure 37 is provided with a sensor 38, which is associated with a length measurement scale on the container 1, thus making it possible to record the sliding movement. The closure 37 is furthermore provided with a pressure sensor 39, as a result of which it is possible to vary the magnetic field of the internal coil 7 within the flow path 5 as a function of pressure and/or movement. The closure 37 may contain a spring internally, which acts against the container 1. This embodiment could, for example, be used in a saddle support of a cycle.

Figure 11:
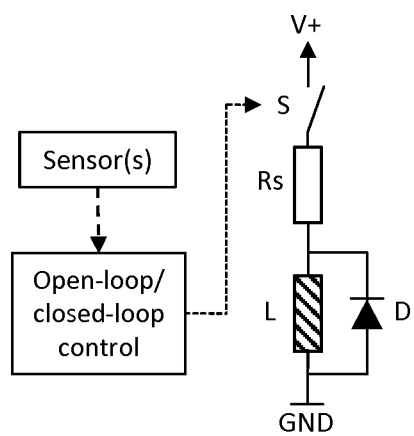
FIGS. 11 and 12 show two circuit diagrams for the operation of the apparatus according to the invention.

FIG. 11 shows an example of a simple, pulsed drive (PWM), in which the coil current can be varied. The switch S may, in the simplest version, be a mechanical switch/push-button; it is advantageous to use a transistor. However, other options are also feasible, such as a relay or else special forms of transistor (MOSFET, IGBT). Inter alia, the switch can also be provided in the GND branch, that is to say between the coil and ground (GND). The resistor Rs is intended to symbolize the possibility of current measurement. In addition to a shunt for measurement, this can be done by other methods, for example a current transformer or an integrated solution (current measurement IC, Hall sensor). The current can be measured at any desired point in the circuit. The diode D is a freewheeling diode which makes it possible to still force current through the coil 7 after S has been opened. The diode can likewise be replaced by a switch (Sync FET).

In addition to the simple control option, the control system can be equipped with various sensors which make it possible to form a control loop. Depending on the purpose, it is possible to use, for example, pressure, force, position, temperature, speed or acceleration sensors. It is also feasible to combine these or other sensors.

Figure 12:
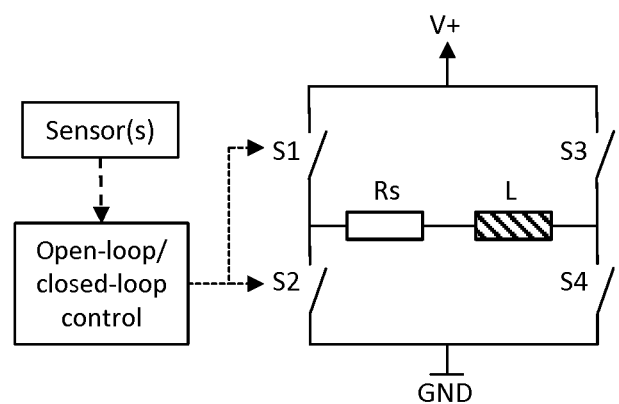

FIG. 12 shows an example of a full bridge (H bridge) used for control purposes. The coil L can thus be operated in both directions, that is to say the polarity of the coil connections can be changed. This makes it possible, for example, to reinforce or to weaken a permanent magnet in the magnetic circuit of the coil. In the case of pulsed operation (PWM), the coil current can be varied. The resistor Rs is intended to symbolize the current measurement option. In addition to measurement using a shunt, this can be done by other methods, for example a current transformer or an integrated solution (current measurement IC, Hall sensor). The point where the current is measured may vary and, for example the measurement may be carried out advantageously in the ground (GND) branch, in order to obtain a measurement signal with respect to GND. Inter alia, a duplicated measurement, for example upstream of S2 and upstream of S4, may also offer advantages, since in this way the current is measured in each half-bridge arm (fault identification). In addition to the simple control option, in this embodiment, the control system can also be equipped with various sensors which allow a control loop to be formed. Depending on the purpose, it is possible to use, for example, pressure, force, position, temperature, speed or acceleration sensors. It is also feasible to combine these or other sensors.

FIG. 13 shows an exemplary embodiment of a partition wall stack in which the flow path is subdivided into a plurality of flow sections 16 by partition walls 15' arranged at a distance from one another. By way of example, one of these flow sections is illustrated in FIG. 12, together with an indication of the flow direction.

In this exemplary embodiment, each partition wall 15' composed of magnetically permeable or ferromagnetic material has its own associated partition wall coil 7', which in each case consists of only a single turn. This turn may, for example, be formed from an insulated conductor.

Electrically speaking, the individual partition wall coils are connected in series, with the output of the respective partition wall coil 7' located above being connected to the input of the partition wall coil 7' located underneath. The contact points are annotated 35.

These partition wall coils 7' may be provided as an alternative to or in addition to the coil 7 in the previous Figs. If they are provided only as an alternative to this coil, then these partition wall coils together form this coil 7.

On the inlet side and outlet side, the turn is preferably at least at most as high as the partition wall itself, thus not preventing the flows through it. The coil may be higher on the side surfaces. The spacers 34 (for example formed in the insulation of the partition wall coil 7') and the contacts 35 can also be arranged here. The coil turn may also be composed of an anodized aluminum foil. It is also possible for this turn to be applied to a printed circuit board. The printed circuit boards are then stacked as a multilayer board.

The partition walls 15' are preferably composed of magnetically permeable, ferromagnetic material, and form the core of the individual partition wall coils.

If these partition wall individual coils are used, then, as already mentioned, there is no need for the coil from the previous exemplary embodiments, with the reference number 7. This results in a weight and space advantage. However, for particularly strong magnetic fields, it is possible to use both coils, namely the coil 7 and the partition wall coils 7'.

The core 6, the partition walls 15 and the sheath may each partially or completely be formed by permanent magnets. For this purpose, they are manufactured at least partially from materials such as magnetic iron or steel alloys, ferrite, AlNiCo, rare earths such as SmCo and NeFeB. Manufacture is also feasible in combination with other materials, as is the case, for example, with plastic-bonded magnets.

The invention claimed is:

1. A movement damping apparatus, comprising:
   an amount of a magnetorheological fluid to be forced through a flow path along a flow direction;
   a magnet device for producing a variable magnetic field acting on the magnetorheological fluid to control flow characteristics thereof;
   said magnet device including a core defining a coil axis and forming pole surfaces through which the magnetic field acts on the magnetorheological fluid and said magnet device including a coil wound around said core and about said coil axis, said core and said coil being disposed in said flow path and said coil axis extending substantially orthogonally to the flow direction; and
   at least one partition wall with additional pole surfaces disposed in said flow path dividing said flow path into at least two flow sections.

2. The apparatus according to claim 1, which comprises a sheath composed of magnetically permeable material encasing said flow path.

3. The apparatus according to claim 1, wherein said axis of said coil lies on a cross-sectional plane of the flow path, resulting in the flow path having an uninterrupted length and the magnetic flux passing through the magnetorheological fluid substantially uniformly.

4. The apparatus according to claim 1, wherein a plurality of partition walls are joined together parallel to one another in at least one pack.

5. The apparatus according to claim 1, which comprises spacers disposed to hold said partition walls at a spacing distance from one another, and wherein said partition walls extend parallel to said flow sections.

6. The apparatus according to claim 1, wherein said coil is a three-dimensional winding, with two winding sections in the form of circular arcs disposed between two straight winding sections extending in the flow direction.

7. The apparatus according to claim 1, wherein said partition walls extending in a row close to one another orthogonally to the flow direction, said partition walls being formed with mutually aligned slots forming said flow path and having slot walls representing additional pole surfaces.

8. The apparatus according to claim 1, wherein said flow path is formed in a cylindrical outlet channel of a container containing said magnetorheological fluid.

9. The apparatus according to claim 1, wherein said core with said wound coil is disposed to divide said flow path into flow sections, and wherein at least one partition wall with additional pole surfaces is disposed in each of said flow sections, and wherein at least one of a sheath of said flow path, or said partition wall, or said core is formed, at least partially, of a material selected from the group consisting of ferromagnetic materials, rare earths, magnetic iron, steel alloys, ferrite, AlNiCo, SmCo, and NeFeB.

10. The apparatus according to claim 1, wherein said flow path is divided into flow sections by said at least one partition wall or by a plurality of partition walls that are separated from one another, and wherein a dedicated partition-wall coil is associated with at least some of said partition walls.

11. The apparatus according to claim 1, wherein said coil is configured to influence a temperature of said magnetorheological fluid.

12. A bicycle, comprising: a frame and a wheel, and the apparatus according to claim 1 disposed between said frame and said wheel.

13. The apparatus according to claim 1, configured as a part of an oscillation damper or a safety-belt lock holder.

14. The apparatus according to claim 1, configured to operate with pressures of 300 bar or more.

15. The apparatus according to claim 1, wherein a length of said coil extending in a direction of flow is at least twice in value than a height thereof.

16. A valve apparatus, comprising
a valve body formed with at least one through-channel defining a flow path with a given flow direction;
a magnet device for producing a magnetic field, said magnet device having a coil wound around a core and pole surfaces disposed in said flow path, said core and said coil dividing said flow path into two flow sections;
a magnetorheological fluid to be forced through said flow path;
said magnet device being configured to produce the magnetic field and thereby control, via said pole surfaces in said flow path, a flow characteristic of said magnetorheological fluid; and
said coil having a coil axis extending at right angles to the flow direction, and the magnetic field being formed in said through-channel to thereby influence the flow characteristic of said magnetorheological fluid in said through channel.

17. The apparatus according to claim 16, wherein said flow path has an uninterrupted length and a magnetic flux generated by said magnet device passes through the magnetorheological fluid substantially uniformly.

18. The apparatus according to claim 16, wherein said flow path is divided into flow sections by one or a plurality of partition walls that are separated from one another, and wherein a dedicated partition-wall coil is associated with at least some of said partition walls.

19. The apparatus according to claim 18, wherein said dedicated partition wall coils are disposed around each partition wall at respective end surfaces thereof.

20. The apparatus according to claim 16, which comprises at least one partition wall with additional pole surfaces in each of said flow sections and subdividing each of said flow sections.

21. The apparatus according to claim 16, wherein said coil is configured to influence a temperature of said magnetorheological fluid.

22. The apparatus according to claim 16, wherein a plurality of partition walls are joined together parallel to one another in at least one pack.

23. The apparatus according to claim 22, which comprises spacers disposed to hold said partition walls at a spacing distance from one another, and wherein said partition walls extend parallel to said flow sections.

24. The apparatus according to claim 16, configured as a part of an oscillation damper or a safety-belt lock holder.

25. The apparatus according to claim 16, wherein flux lines of the magnetic field run substantially at right angles through said flow sections and said pole surfaces.

26. The apparatus according to claim 16, configured to operate with pressures of 300 bar or more.

27. The apparatus according to claim 16, wherein a length of a coil of said magnet extending in a direction of flow is at least twice in value than a height thereof.

* * * * *